(12) United States Patent
Storz et al.

(10) Patent No.: US 7,484,230 B2
(45) Date of Patent: Jan. 27, 2009

(54) SCANNING DEVICE FOR AN APPARATUS FOR READING FROM OR WRITING TO OPTICAL RECORDING MEDIA

(75) Inventors: Martin Storz, Villingen-Schwenningen (DE); Susann Ayari, Bad Dürrheim (DE)

(73) Assignee: Thomson Licensing, Boulogne Billancourt (FR)

( * ) Notice: Subject to any disclaimer, the term of this patent is extended or adjusted under 35 U.S.C. 154(b) by 948 days.

(21) Appl. No.: 10/947,025

(22) Filed: Sep. 21, 2004

(65) Prior Publication Data

US 2005/0066347 A1   Mar. 24, 2005

(30) Foreign Application Priority Data

Sep. 24, 2003   (DE) ................. 103 44 504

(51) Int. Cl.
*G11B 21/24*   (2006.01)
(52) U.S. Cl. ................................ 720/691
(58) Field of Classification Search ............ 720/691
See application file for complete search history.

(56) References Cited

U.S. PATENT DOCUMENTS

| 4,367,543 | A | 1/1983 | Araki et al. ............ 369/45 |
| 5,287,337 | A | 2/1994 | Akiba et al. .......... 369/44.15 |
| 5,341,246 | A | 8/1994 | Oono et al. | |
| 5,828,635 | A | * 10/1998 | Choi ................. 369/44.14 |

FOREIGN PATENT DOCUMENTS

| DE | 1 812 867 | 6/1960 |
| DE | 1 778 808 | 12/1968 |
| DE | 30 27 950 | 7/1980 |
| DE | 38 00 428 A 1 | 1/1988 |
| DE | 691 19 473 T2 | 2/1991 |
| DE | 198 60 563 C2 | 12/1998 |
| DE | 103 18 196 A1 | 4/2003 |
| EP | 1331634 | 1/2003 |
| GB | 2 389 874 A | 12/2003 |
| JP | 11-102525 | 4/1999 |
| JP | 2001-291271 | 10/2001 |
| JP | 2002-350701 | 12/2002 |
| JP | 2003-067942 | 3/2003 |
| WO | WO02/052554 | 7/2002 |

OTHER PUBLICATIONS

Patent Abstract of Japan; Appl. No. 62255107; Date of Filing: Aug. 10, 1987; Inventor: Nakamura Hiroshi.
German Search Report (English Translation Attached), Jan. 2004.

* cited by examiner

*Primary Examiner*—Angel A. Castro
(74) *Attorney, Agent, or Firm*—Joseph J. Laks; Harvey D. Fried; Patricia Verlangieri

(57) ABSTRACT

A scanning device for an apparatus for reading from or writing to optical recording media, with at least one mounting device with a receptacle along an optical axis for an optical component arranged on a cylindrical holder and with setting elements for the holder along the axis or along and about the axis is disclosed. The scanning device of this type reduces the number of setting elements for adjusting an optical component and the setting elements are formed and arranged in a space-saving manner which considerably simplifies the adjusting operation.

11 Claims, 5 Drawing Sheets

SCANNING DEVICE FOR AN APPARATUS FOR READING FROM OR WRITING TO OPTICAL RECORDING MEDIA

FIELD OF THE INVENTION

The invention relates to a scanning device for an apparatus for reading from or writing to optical recording media, in which the scanning device reads or stores information or data in one or more tracks of a recording medium. The recording medium may in this case be a compact disc, known as a CD, a digital versatile disc, known as a DVD, a CD- or DVD-ROM or a rewritable CD or DVD or else some other recording medium.

BACKGROUND OF THE INVENTION

Apparatuses for recording or reproducing information or data in one or more tracks of a recording medium which are provided with a scanning device, referred to as a "pick-up", for reading or recording the information are known. The respective scanning device is usually arranged on a carriage which can be made to move obliquely or perpendicularly in relation to the respective recording track of the recording medium and, by being electromotively driven, said carriage can be made to move at high speed and with great positioning accuracy, combined with a short access time to different locations of the recording medium.

The optical scanning devices comprise in a known way a series of optical components for directing and aligning a laser beam on the path to the respective recording medium and from the latter to a detector, such as gratings, beam splitters, a collimator, deflecting mirrors, quarter-wave plates and lenses, which must be arranged very precisely in relation to one another to allow the respective recording medium to be illuminated positionally accurately and its data to be transmitted accurately to an optical detector. Since all the optical components and mechanical parts have specific production and assembly tolerances, some components must be adjustable before they are securely arranged, in particular by adhesive bonding, on the scanning device. These generally include a number of optical gratings, the collimator and a focusing lens.

Only a small space is available for arranging or actuating the required holding devices and adjusting tools, since the dimensions of the optical drives including the scanning device are minimized in particular to meet computer standards, so that the holding devices and adjusting tools must be designed correspondingly.

The subject matter of JP 01-096612 is a mounting device, serving at the same time as an adjusting device, for a lens fixed in a cylindrical lens holder by an adhesive bond. In the case of this adjusting device, the lens holder is arranged in a base block with a cylindrical receptacle and is adjustable about and along its optical axis. Two setting screws, which are arranged on the base block, are in operative connection with a flank arranged on the lens holder tangentially in relation to the optical axis and the actuation of which brings about a clockwise or counterclockwise rotation of the lens holder, serve for the adjustment about the optical axis. For the adjustment in the axial direction, provided on the base block is a setting screw with an eccentrically arranged pin, which is in engagement with a coaxial circumferential groove, arranged on the lens holder, and the rotation of which brings about a displacement of the lens holder in the axial direction. Consequently, a number of setting elements or individual devices are required and have to be actuated for the adjustment of the lens in the direction of the optical axis and about the optical axis.

Furthermore, it is known to mount an optical component in a prismatic mounting part with two surfaces arranged substantially at right angles to each other, which is made to bear with a leaf spring against two reference surfaces of a base part of the scanning device, a so-called optic body, which are aligned parallel to the optical axis. This mounting part can be displaced with an eccentric setting element along the reference surfaces, and consequently along the optical axis. The engagement for an adjusting tool is in this case provided via an opening in the bottom of the base part.

It is also known to arrange a cylindrical mounting part, in which an optical component is adhesively embedded, with a leaf spring on two reference surfaces aligned parallel to the optical axis and arranged substantially at right angles to each other, in such a way that the mounting part is provided with an eccentric setting element which can be displaced along the optical axis, by an adjusting tool which can be brought into engagement with said setting element via an opening in the base part and can be rotated about the optical axis by a further setting element for a corresponding adjusting tool.

The known arrangements described above require not only corresponding setting elements to avoid a "stick-slip effect" and to ensure a smooth setting movement of the respective mounting part during the adjustment, but also a relatively great freedom of movement for the respective adjusting tool. If a possibility of adjusting the optical element about the optical axis is additionally required, an adjusting tool designed for this movement is necessary, so that possibly two setting operations with two different adjusting tools have to be carried out for an adjustment of the optical element. Moreover, there are limits to the accuracy of the respective setting movement, so that a predetermined desired position of the optical element may require a number of corrective adjustments.

SUMMARY OF THE INVENTION

It is an object of the invention to design a scanning device for an apparatus for reading from or writing to optical recording media in such a way that the number of setting elements required for an adjustment of an optical component is reduced and the setting elements themselves are formed and arranged in a space-saving manner and considerably simplify an adjusting operation.

The invention consists in that, in the case of a scanning device which has in a known way a base block and at least one mounting device with a receptacle fixed to the base block along an optical axis for a cylindrical holder with an optical component and setting elements, with which an adjusting movement of the holder along the optical axis is made possible, the receptacle has a hollow-cylindrical bearing surface corresponding to the holder, and arranged on said bearing surface and on the circumference of the holder are thread segments which correspond to one another and engage in one another, whereby a rotational movement of the holder about the optical axis is converted into an axial movement. To initiate this rotational movement, the holder is provided with an engagement opening for an adjusting tool, which is accessible through an opening in the base block. In this way, a scanning device in which an optical component to be adjusted along the optical axis can be positioned very accurately is designed. Positional corrections are not required, since the setting by means of the thread segments takes place very smoothly, meaning that actuation of the adjusting tool leads to only a slight movement of the holder along the optical axis. The smooth setting action can be enhanced by the design of the adjusting tool, in that it is provided with a relatively long grip for the formation of a relatively long setting lever. The arrangement of the adjustable holder in the mounting device and the arrangement of the associated setting elements which are accessible through an opening in the base block is very space-saving. A precondition for the use of the adjustable holder is that the optical component held by it is rotationally symmetrical in relation to the optical axis.

In a preferred configuration, the engagement opening is formed on a lug on the cylindrical holder which is coaxial to the optical axis and is arranged in the region of the opening formed in the base block. The engagement opening itself is a bore, the diameter of which corresponds to the diameter of an insert pin formed on the adjusting tool.

The opening may be formed as a slot arranged transversely in relation to the optical axis and have an opening width corresponding to the adjusting tool, in such a way that the wall of the opening is a guide for the adjusting tool. This design facilitates the implementation of the adjusting operation.

In order permanently to secure a setting which has been performed, it is necessary to fix the holder on the scanning device or the receptacle. This may take place in a simple way by a fixing hole for receiving an adhesive, which is accessible through a secondary opening in the base block, being introduced into the receptacle, in the region of the thread segment of the holder.

For a scanning device which has a mounting device with a cylindrical holder for an optical component which can be set along and about the optical axis, the invention consists in that an engagement opening for an adjusting tool for performing adjusting movements along and about the optical axis is formed in the holder and is accessible through an opening in the base block, the adjusting tool having an eccentrically arranged insert pin for the engagement opening and this tool and the opening being formed in such a way that a rotational movement of the same about its axis causes a movement of the holder along the optical axis and a pivoting movement of the same transversely in relation to the optical axis causes a rotational movement of the holder about the latter. Consequently, only a single insertion opening and only a single adjusting tool are required for the two adjustments, and they only have to be brought into engagement with each other once. If a person performing the adjustments is appropriately skilled, the two adjustments can be performed by simultaneous turning and pivoting of the adjusting tool.

In a preferred configuration, the opening in the base block is a slot formed transversely in relation to the optical axis and provided in the direction of the holder with an offset which forms a bearing surface for the adjusting tool, the bearing surface being curved coaxially in relation to the optical axis, in order to ensure when there is a pivoting movement of the adjusting tool that it engages with the holder. The adjusting tool is likewise offset on the engagement opening side and has for the coaxial bearing surface an annular bearing shoulder, the insert pin of the adjusting tool being in positive engagement with the engagement opening when the shoulder bears against the bearing surface.

Once an adjustment of the optical component has been made, the holder is securely connected to the scanning device or the receptacle, in that the position of the engagement opening in the base block is fixed at the opening by an adhesive.

BRIEF DESCRIPTION OF THE DRAWINGS

The invention is explained below on the basis of an exemplary embodiment. In the associated drawings.

DETAILED DESCRIPTION OF PREFERED EMBODIMENTS

Figure 1:
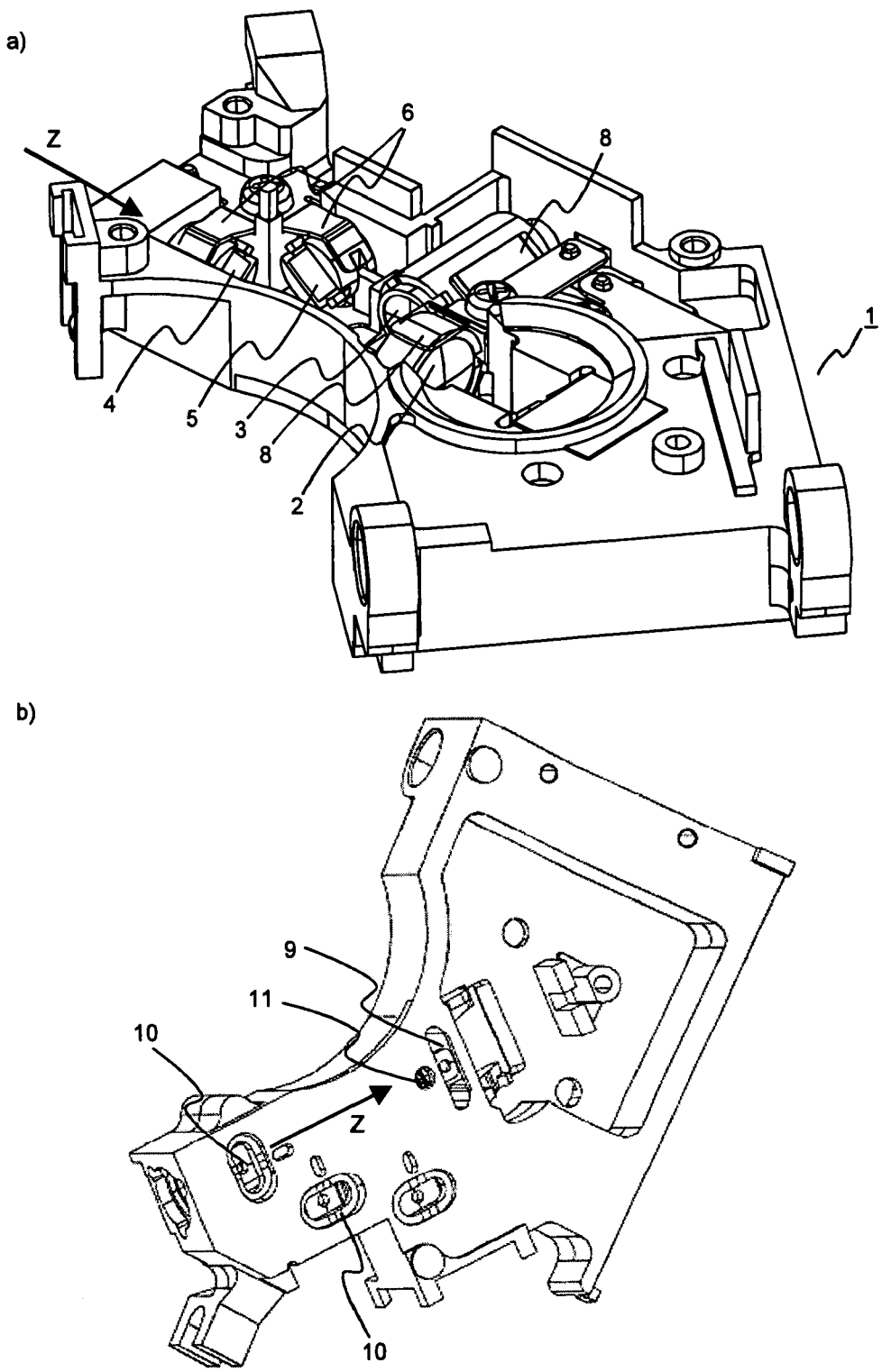
FIG. 1a shows a DVD/CD scanning head in a perspective view from its upper side.
FIG. 1b shows the base block of the scanning head in a perspective view from its underside.

The scanning head shown in FIG. 1 has a base block 1, on which there are, apart from some optical components that are not represented any further, mounting devices for a collimator lens 2, a focusing lens 3, a DVD grating 4 and a CD grating 5 arranged as optical components to be adjusted during the assembly of the scanning head. The respective mounting devices are formed by a receptacle fixed to the base block along an optical axis Z (for 2 and 4) or along an optical axis formed transversely in relation to the latter (for 3 and 5), a cylindrical holder for the respective optical component 2, 3, 4 and 5 and setting elements for the respective holder in the direction of the respective optical axis or in the direction of the latter and about the latter. The respective holder is subjected to spring force by a leaf spring 6, 7 and 8 transversely in relation to the optical axis and is held by said spring displaceably or displaceably and rotatably in the receptacle.

Figure 2:
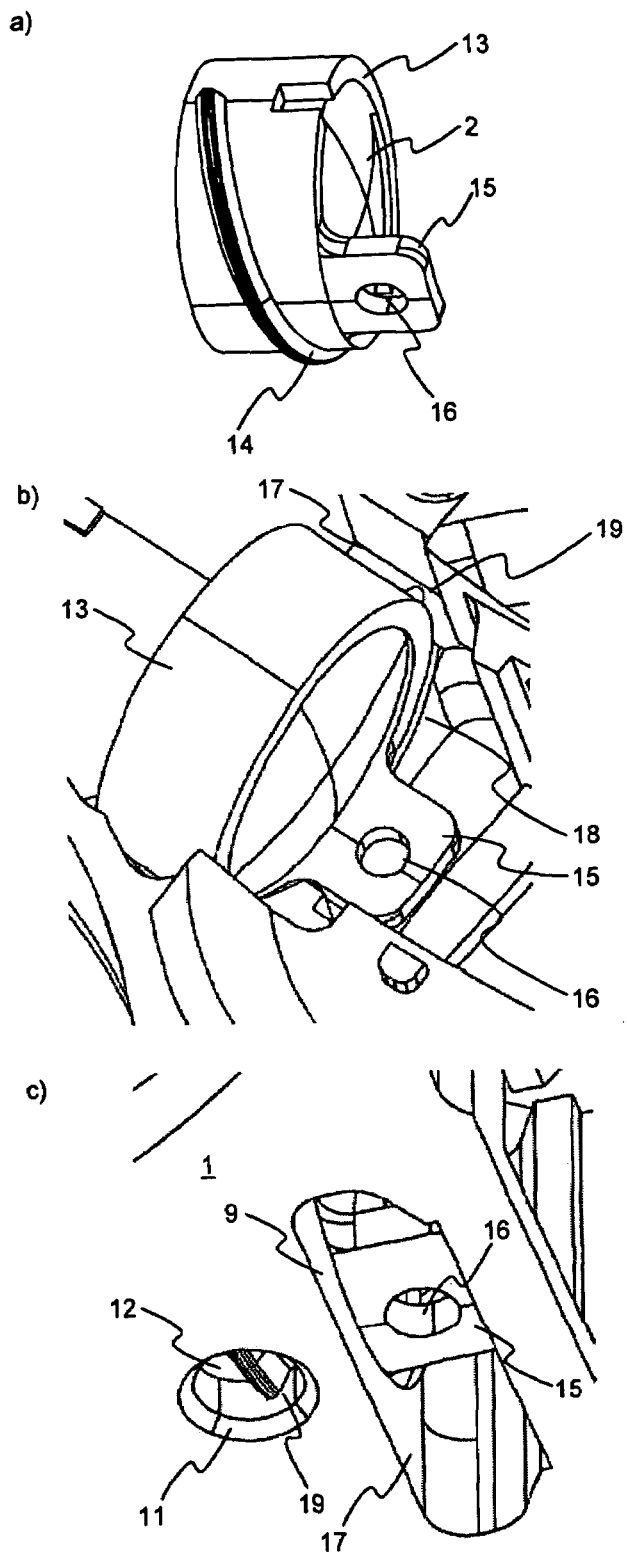
FIG. 2a shows a cylindrical collimator holder for arrangement in a receptacle formed on the base block.
FIG. 2b shows the collimator-holder base block preassembled.
FIG. 2c shows an adjusting position obtained for the preassembled collimator holder on the underside.

FIG. 2b shows a view of the underside of the base block 1 with openings 9 and 10, via which an engagement opening formed on the respective holder is respectively accessible for an adjusting tool for performing a setting movement along the or along and about the optical axis Z (for 2 and 4) or along and about an optical axis arranged transversely in relation to the latter (for 3 and 5). Arranged at a small distance from the opening 9 is a secondary opening 11 as an access opening for a fixing hole 12.

Described below are the mounting devices for the collimator 2 and for the DVD grating 4, the latter being representative of the CD grating 5, and the focusing lens 3, which are arranged along an optical axis transversely in relation to the axis Z on the base block 1.

Figure 3:
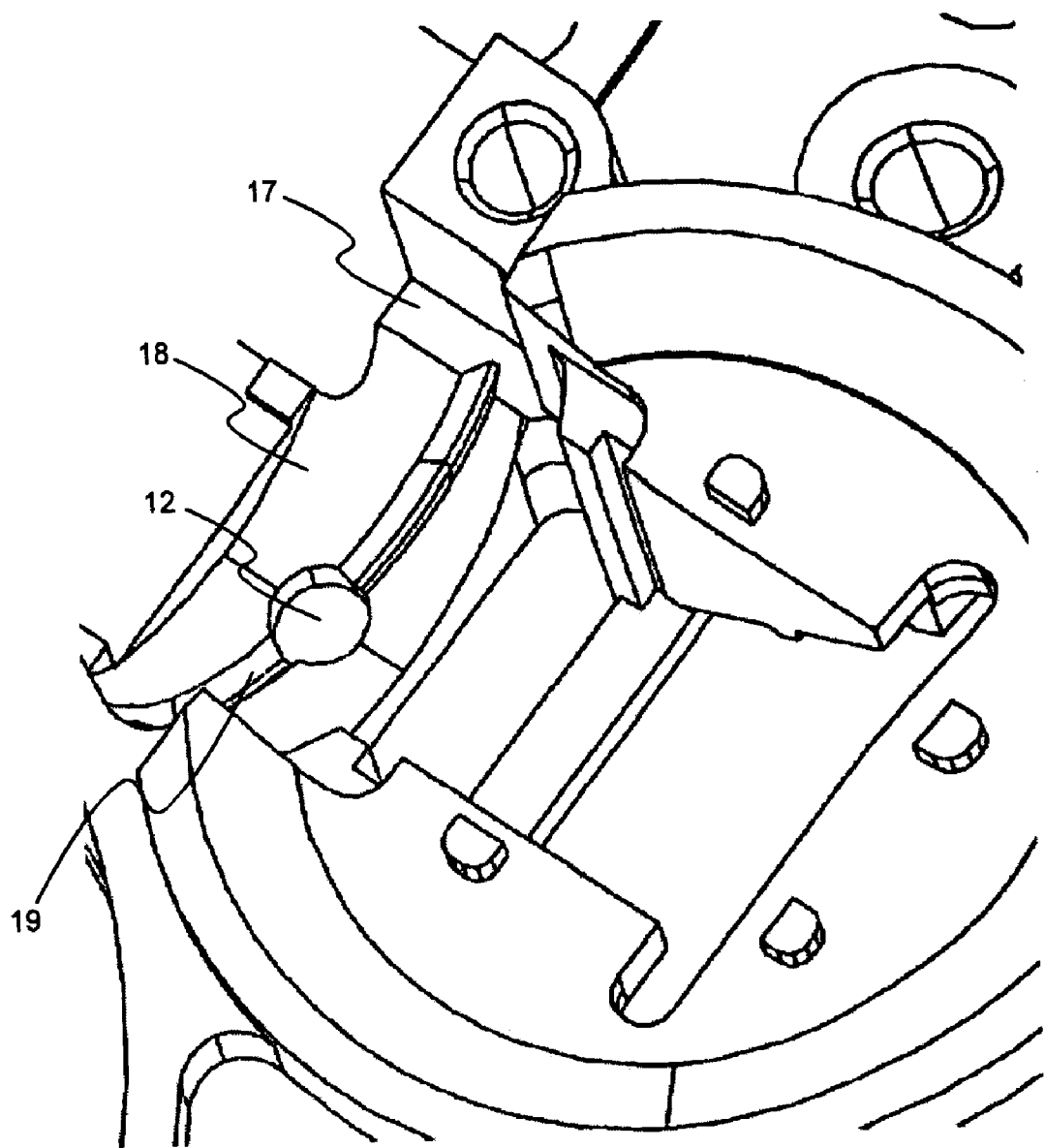
FIG. 3 shows the receptacle formed on the base block for the collimator holder.

Shown in FIG. 2a is the cylindrical holder 13 for and with the collimator 2. The holder 13 has on its circumference a thread segment 14, which is substantially formed in an angular range of 180°. In the region of the middle of the same (14), a lug 15 into which an engagement bore 16 for an adjusting tool has been introduced is formed onto the holder 13 coaxially and axially parallel. For this holder 13, arranged coaxially in relation to the axis Z on the base block 1 is a receptacle 17, shown in FIG. 3, with a hollow-cylindrical bearing surface 18, the inside diameter of which corresponds to the outside diameter of the holder 13. A groove 19, which corresponds in form and cross section to the thread segment 14, and the fixing hole 12 have been introduced into the wall of the receptacle 17, in the region of the bearing surface 18.

Shown in FIG. 2b is the collimator holder 13 positioned in the receptacle 17, said holder bearing against the bearing surface 18 in the region of the thread segment 14 and thereby engaging positively with its thread segment 14 in the groove 19. The lug 15 is arranged substantially parallel to the bottom of the base block 1 and in the region of the opening 9, so that the engagement bore 16 is accessible through this opening 9. FIG. 2c illustrates the arrangement in the view from the underside of the base block 1.

Figure 6:
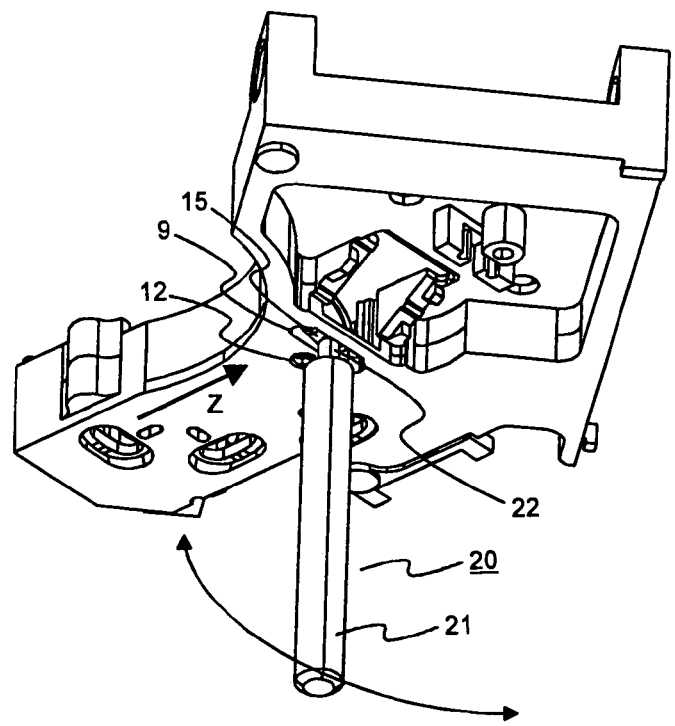

For the adjustment of the collimator holder 13 prepositioned in the receptacle 17 and secured by the leaf spring 6, and provided with the collimator lens 2, an adjusting rod 20 (FIG. 6) is inserted through the opening 9, formed as a slot transversely in relation to the axis Z, into the engagement bore 16. This rod (20) has an elongate gripping shank 21 and, arranged on its end face on the base block side, an insert pin 22 for the engagement bore 16, the outside diameter of which is adapted to the inside diameter of said bore. By pivoting the adjusting rod 20 transversely in relation to the axis Z, the collimator holder 13 is rotated about this axis into the desired position. Following this, said holder is fixed in the set desired position in the receptacle 17 by introducing an adhesive into the fixing hole 12 on the base block 1.

Figure 4:
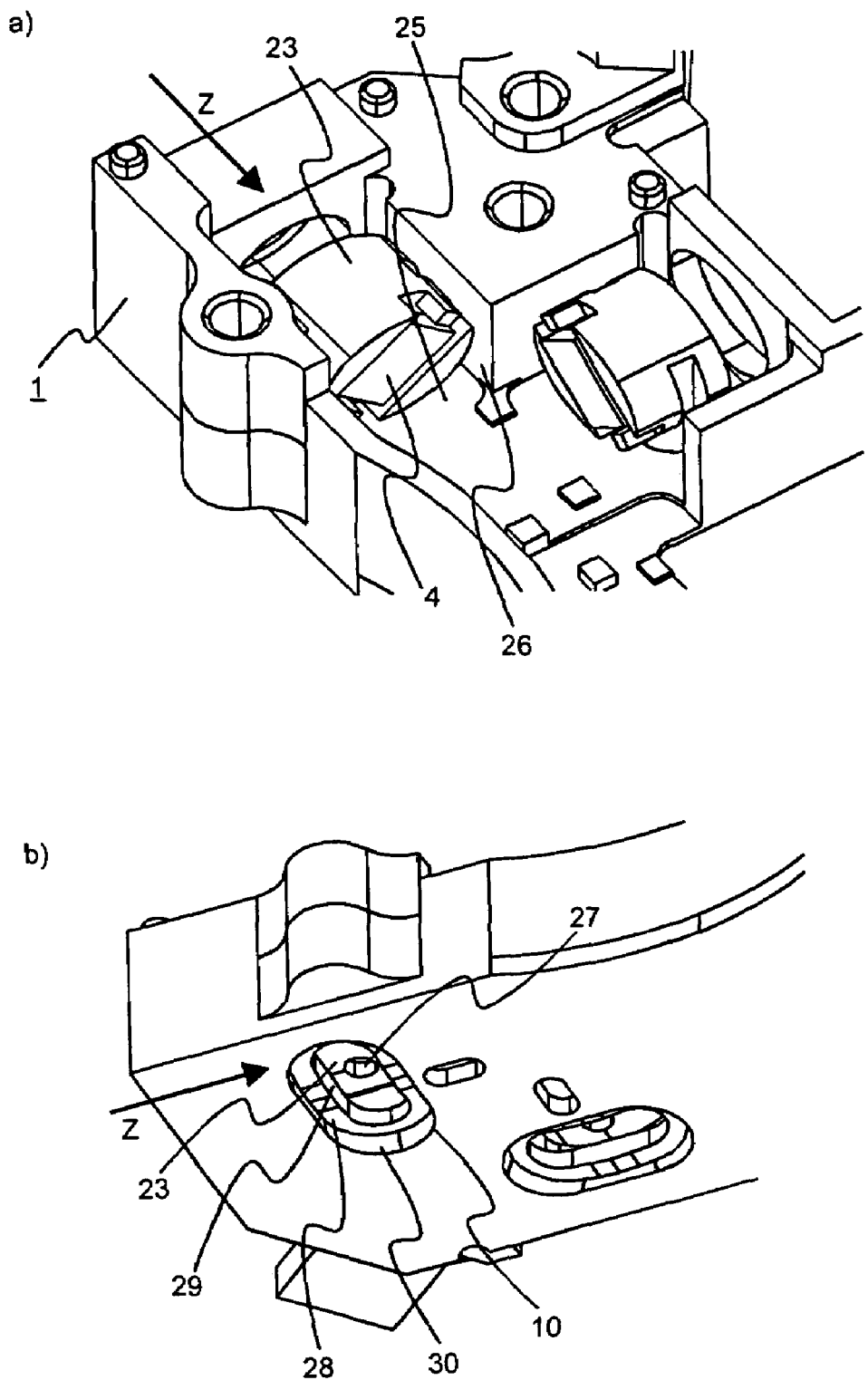
FIG. 4a shows a DVD-grating holder arranged on the base block in a receptacle for it
FIG. 4b shows an adjusting position obtained for it on the underside.

Shown in FIGS. 4a and b as well as 5 are the formation and arrangement of the cylindrical DVD-grating holder (holder) 23 provided with the DVD grating 4 and also the setting of the same with an adjusting tool 24. As FIG. 4a reveals, the holder 23 is prepositioned along the optical axis Z in one of two axially parallel bearing surfaces 25 and 26 arranged at right angles to each other and is thereby pressed by the leaf spring 6, represented in FIG. 1, against these bearing surfaces 25 and 26. Formed in the holder 23 is an engagement opening 27 for the adjusting tool 24, which during the prepositioning of the holder 23 comes into such an arrangement that it is accessible through the slot opening 10 on the underside of the base block 1 (FIG. 1). The slot opening 10 is formed transversely in relation to the axis Z and offset in the direction of the holder 23, the bearing surface 28 formed by the offset being curved coaxially in relation to the axis Z and the slot surfaces 29 and 30 arranged substantially perpendicularly in relation to the base area of the base body being guiding surfaces for the adjusting tool 24.

The adjusting tool 24 (FIG. 5) has an elongate shank with a grip 31, formed on which there are, on the base block side an annular shoulder 32, formed by an offset, for bearing against the bearing surface 28 and, on the end face, an eccentrically arranged insert pin 33 for the engagement opening 27, the diameter of the insert pin 33 corresponding to that of the insertion opening 27 and the diameter of the offset gripping shank corresponding to the respective slot surfaces 29 and 30 (FIG. 4b).

Figure 5:
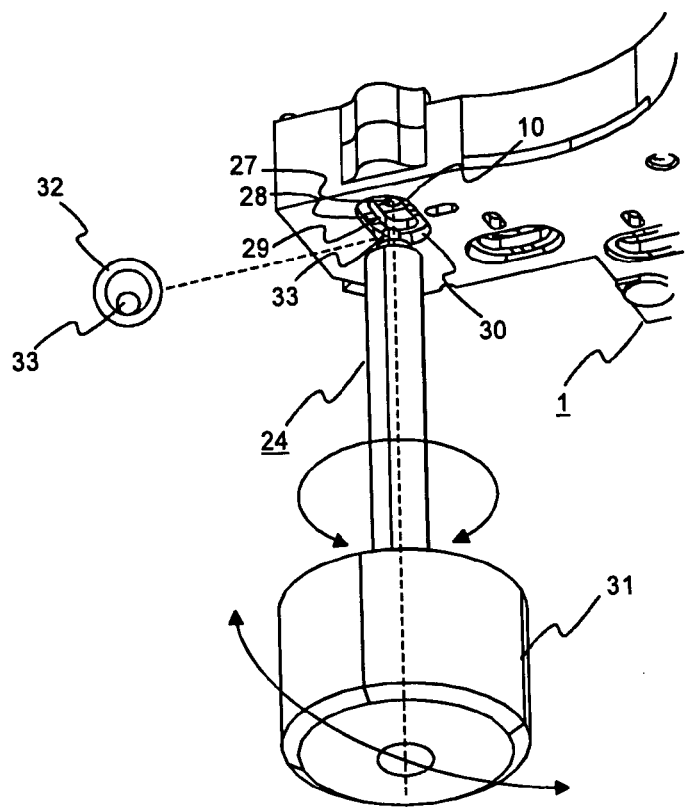
FIG. 5 shows an adjusting tool for the DVD-grating holder and FIG. 6 shows an adjusting tool for the collimator holder.

As FIG. 5 reveals, this adjusting tool 24 is inserted with the insert pin 33 through the slot opening 10 into the engagement opening 27 and is then located with said pin (33) substantially over its (33) entire length in positive engagement with the insertion opening (27) when the shoulder 32 bears against the bearing surface 28, and is laterally guided transversely in relation to the axis Z by the slot surfaces 29 and 30. A rotational movement of the adjusting tool 24 about the shank axis initiates through the eccentrically arranged insert pin 33 an adjusting movement of the holder 23 in the direction of the axis Z and a pivoting movement transversely in relation to the axis Z initiates a rotational movement of the holder 23 about the said axis. Following an adjustment into the predetermined desired position, an adhesive is introduced into the slot opening 10 after removal of the adjusting tool 24 and the holder 23 is fixed by said adhesive.

What is claimed is:

1. A scanning device for an apparatus for reading from or writing to optical recording media, comprising:
    a base block having at least one mounting device with a receptacle fixed to the base block along an optical axis for an optical component arranged on a cylindrical holder, with setting elements, which make an adjusting movement of the holder in the receptacle possible along the optical axis, and with a spring device acting on the respective holder in the direction of the receptacle transversely in relation to the optical axis,
    wherein the receptacle has a hollow-cylindrical bearing surface corresponding to the holder, wherein arranged on the circumference of the holder and on the bearing surface are thread segments which correspond to one another and engage in one another, and convert a rotational movement of the holder into an axial movement, wherein an engagement opening for an adjusting tool for performing a rotational movement is formed on the holder and wherein this engagement opening is accessible through an opening in the base block.

2. The scanning device of claim 1 wherein the engagement opening is a bore which has been introduced into a lug arranged coaxially on the holder.

3. The scanning device of claim 1 wherein the adjusting tool is formed by an elongate grip and an insert pin, arranged centrally on the one end face of said grip, for the engagement opening.

4. The scanning device of claim 1 wherein the opening is formed as a slot transversely in relation to the optical axis (Z).

5. The scanning device of claim 1 wherein a fixing hole which is accessible through a secondary opening in the base block is arranged in the receptacle, in the region of the thread segment.

6. A scanning device for an apparatus for reading from or writing to optical recording media, comprising:
    a base block and at least one mounting device with a receptacle fixed to the scanning device along an optical axis for an optical component arranged on a cylindrical holder and with setting elements, which make an adjusting movement of the holder in the receptacle possible along and about the optical axis, and with a spring device acting on the respective holder in the direction of the receptacle transversely in relation to the optical axis,
    wherein an engagement opening for an adjusting tool for performing adjusting movements along and about the optical axis (Z) is formed in the holder and is accessible through an opening in the base block, the adjusting tool having an eccentrically arranged insert pin for the engagement opening and this tool and the opening being formed in such a way that a rotational movement of the adjusting tool about its axis causes a movement of the holder along the optical axis (Z) and a pivoting movement of the adjusting tool causes a rotational movement of the holder about the optical axis (Z).

7. The scanning device of claim 6 wherein the opening is a slot formed in relation to the optical axis (Z) and is offset in the direction of the holder for the formation of a bearing surface for the adjusting tool, the bearing surface being curved coaxially in relation to the optical axis (Z).

8. The scanning device of claim 6 wherein, for the formation of an annular shoulder for the bearing surface, the adjusting tool is offset on the engagement opening side in such a way that the insert pin is in positive engagement with the engagement opening when the shoulder bears against the bearing surface.

9. The scanning device of claim 6 wherein the adjusting tool is provided on the side remote from the insert pin with an actuating handle, for providing a rotational movement about its own axis.

10. The scanning device of claim 6 wherein the fixing hole or the opening serve for the arrangement of an adhesive after adjustment of the respective holder on the receptacle has been performed.

11. The scanning device of claim 6 wherein at least one optical component is arranged such that it can be adjusted along the optical axis (Z), and at least one is arranged such that it can be adjusted along and about the axis (Z).

* * * * *